No. 845,759. PATENTED MAR. 5, 1907.
H. C. CLAY.
SAND CAP FOR WHEEL HUBS.
APPLICATION FILED AUG. 6, 1906.
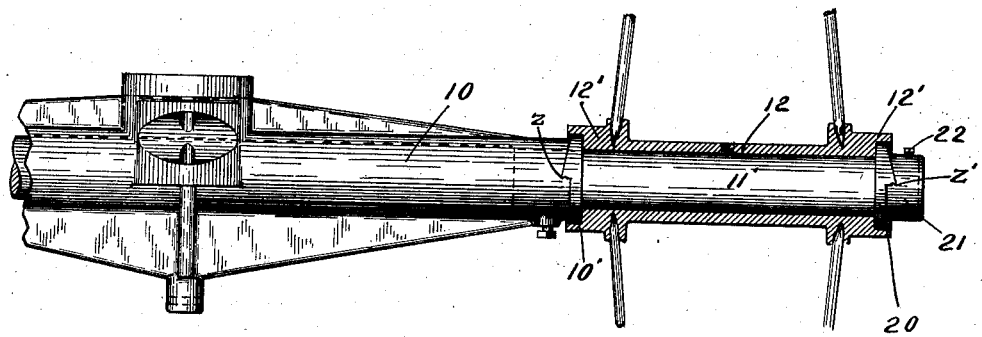
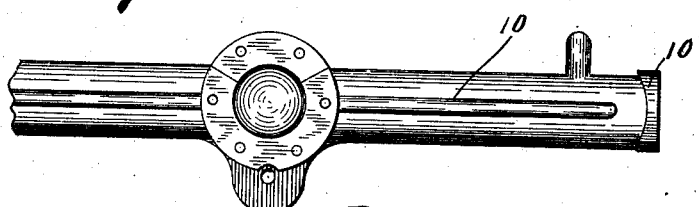
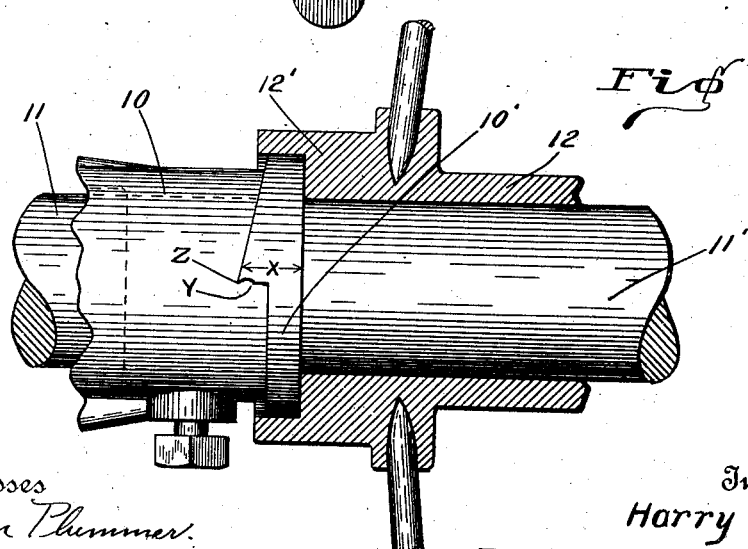
Witnesses
Vernon Plummer
Thomas W. McMeans
Inventor
Harry C. Clay.
By Bradford Hood
Attorneys

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

SAND-CAP FOR WHEEL-HUBS.

No. 845,759.          Specification of Letters Patent.          Patented March 5, 1907.

Application filed August 6, 1906. Serial No. 329,474.

*To all whom it may concern:*

Be it known that I, HARRY C. CLAY, a citizen of the United States, residing at Columbus, in the county of Bartholomew and State of Indiana, have invented certain new and useful Improvements in Sand - Caps for Wheel-Hubs, of which the following is a specification.

The object of my invention is to produce a simple cheap structure for preventing sand and dirt from entering the bearings of wheels of vehicles.

The accompanying drawings illustrate my invention.

Figure 1 is a front elevation of one end of the front axle of a traction-engine embodying my invention, the hub of a wheel being shown in section on the end of the axle. Fig. 2 is a plan of one end of the axle; Fig. 3, an enlarged sectional detail.

In the drawings, 10 indicates an axle structure which is cored to receive a piece of shafting 11, passed therethrough and secured therein by any suitable means, such as a set-screw, each end of the shaft 11 projecting at 11' to form a support upon which the wheel 12 is journaled. Each end of the axle structure is provided with a flange 10', which is gradually increased in width from its narrowest width at the top to a considerably greater width X at about the horizontal middle, and at this point the flange is suddenly reduced in width, and preferably undercut, as at Y, so as to form a comparatively sharp depending liquid - shedding edge Z, which lies substantially at right angles to the external surface of the axle structure.

The hub of the wheel 12 at its inner end carries an annular flange 12', said flange being of a width greater than the width of the flange 10' at its top, but less than the dimension X of said flange 10'. The outer end of the hub of the wheel 12 is similarly provided with a flange 12', coöperating with a flange 20, carried by a cap 21, fitted upon the outer extended end of the portion 11' of the axle and secured thereto in any suitable manner, as by a set-screw 22. The flange 20 is exactly like the flange 10', being narrower at its upper side and extended to form a depending overhanging liquid-shedding edge Z' like the edge Z.

In operation the flanges 10' and 20 remain stationary, while the wheel rotates on the axle 11. Any sand, dirt, or mud which may drop from the inner end of flange 12' will drop either upon the axle structure 10 or upon the cap 21 and will run from thence downward on the surface thereof and striking the flared portion of the adjacent flange 10' or 20 will be guided axially away from the wheel until it reaches the depending edge Z or Z', from which it will drop straight down, and this overhanging edge being axially beyond the outer end of the hub of the wheel the dirt cannot enter said hub, and consequently cannot enter the bearing of the wheel.

I claim as my invention—

1. The combination, with a rotatable wheel having an axial annular flange, of a non-rotating member entering said annulus, said member having a surface inclined to the axis of the wheel with its upper end lying within the annulus and its lower end extending beyond the annulus and undercut to form a liquid-shedding edge.

2. The combination, with an axle and a wheel journaled thereon, of an annular flange carried by said wheel and a flange carried by the axle and lying within said annulus, said flange being of less axial width at its upper end than at a point nearer the horizontal middle of the axle, the dimension at the said last-mentioned point being greater than the width of the annulus carried by the wheel.

3. The combination, with an axle and a wheel journaled thereon, of an annular flange carried by said wheel, and a flange carried by the axle and lying within said annulus, said flange being of less axial width at its upper end than the annulus and than at a point nearer the horizontal middle of the axle, the dimension at the said last-mentioned point being greater than the width of the annulus carried by the wheel, and flange at said last-mentioned dimension being suddenly reduced in its axial dimension and undercut to form a water-shedding edge.

4. The combination, with an axle and a wheel journaled thereon, of an annular flange carried by said wheel, a flange carried by the axle and lying within said annulus, said flange being of less axial width at its upper end than the annulus and than at a point nearer the horizontal middle of the axle, the dimension at the said last-mentioned point being greater than the width of annulus carried by the wheel, an annular flange carried by the outer end of the wheel, a cap secured to the projecting end of the axle beyond the wheel, and a flange carried by said cap and lying within said last-mentioned annulus, said cap-flange having a width at its upper end less than the width of the annulus carried by the wheel and a width nearer its horizontal middle greater than the width of the flange carried by the wheel.

5. The combination, with an axle and a wheel journaled thereon, of an annular flange carried by said wheel, a flange carried by the axle and lying within said annulus, said flange being of less axial width at its upper end than the annulus and than at a point nearer the horizontal middle of the axle, the dimension at the said last-mentioned point being greater than the width of annulus carried by the wheel, and the said flange carried by the cap being suddenly reduced in its last-mentioned axial dimension and undercut to form a water-shedding edge.

In witness whereof I have hereunto set my hand and seal, at Columbus, Indiana, this 25th day of July, A. D. 1906.

HARRY C. CLAY. [L. S.]

Witnesses:
PEARL RUPPRECHT,
JESSIE McDOUGAL.